United States Patent [19]

Bradley, Jr.

[11] 4,072,165

[45] Feb. 7, 1978

[54] POPPET RELIEF VALVE

[75] Inventor: Charles Duane Bradley, Jr., Kalamazoo, Mich.

[73] Assignee: Pneumo Corporation, Boston, Mass.

[21] Appl. No.: 682,712

[22] Filed: May 3, 1976

[51] Int. Cl.² .............................................. F16K 17/18
[52] U.S. Cl. .................................................... 137/493
[58] Field of Search .................. 137/493, 522; 251/82, 251/83

[56] References Cited

U.S. PATENT DOCUMENTS

| | | | |
|---|---|---|---|
| 2,778,378 | 1/1957 | Presnell | 137/522 X |
| 2,804,881 | 9/1957 | Seid | 137/493 |
| 3,067,770 | 12/1962 | Fancher | 137/493 |
| 3,483,886 | 12/1969 | Napolitano | 137/493 |

*Primary Examiner*—Robert G. Nilson
*Attorney, Agent, or Firm*—Donnelly, Maky, Renner & Otto

[57] ABSTRACT

A poppet type relief valve includes a poppet and associated seat with the poppet being mounted in an actuator which is connected to the poppet by a lost-motion connection. The poppet is spring loaded with respect to the actuator, and the actuator is also spring loaded toward the seat. When pressure is applied between the poppet and the actuator, the actuator is forced back against its spring until the lost motion is taken up. Further increases in pressure cause the actuator to pull the poppet away from its seat permitting flow through the valve in one direction. Pressure applied on the opposite side of the poppet causes the poppet to move away from the seat without necessarily moving the actuator simply by overcoming the force of the spring between the poppet and the actuator. Thus, pressure on one side of the poppet will cause it to open at a predetermined pressure, and pressure on the opposite side will also cause it to open at another predetermined pressure.

14 Claims, 3 Drawing Figures

POPPET RELIEF VALVE

This invention relates generally as indicated to a poppet type relief valve and more particularly to a relief valve which will open to provide flow in either direction in response to pressures on the valve. Thus, a "forward" and "reverse" flow condition can have separate and unrelated modes of operation, yet both utilize the same poppet and seat.

In applications that require flow at some relief pressure in the "forward" flow direction but unrestricted flow in the "reverse" direction, a pressure relief valve in parallel with a check valve is often employed. However, when leakages in the "forward" direction at pressures below the relief valve setting must be minimized, the check valve simply becomes one more leak path that will contribute to the total leakage. With the present invention, there is provided a relief valve which will provide both forward and reverse flow at predetermined pressures, but which eliminates the leak path from the check valve by passing both forward and reverse flow through the same seat.

It is accordingly a principal object of the present invention to provide a relief valve wherein flow in both directions is provided through the same seat.

Another principal object is the provision of a poppet type relief valve which will open to provide flow in either direction at predetermined pressures.

Another important object is the provision of such relief valve wherein the flow condition in either direction is provided by separate and unrelated modes of operation, yet both pass through the same seat.

A further object is the provision of a relief valve utilizing a seat, a plunger, and an actuator for the plunger connected thereto by a lost-motion connection so that at a predetermined pressure, the actuator will pull the plunger away from the seat thus providing flow through the valve in one direction.

Another object is the provision of a relief valve wherein the plunger can be moved away from the seat to provide flow in the opposite direction without necessarily moving the actuator.

Yet another object is the provision of a relief valve having the characteristics outlined above which is of simplified construction and which can readily be manufactured, installed, and serviced.

Other objects and advantages of the present invention will become apparent as the following description proceeds.

To the accomplishment of the foregoing and related ends, the invention then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
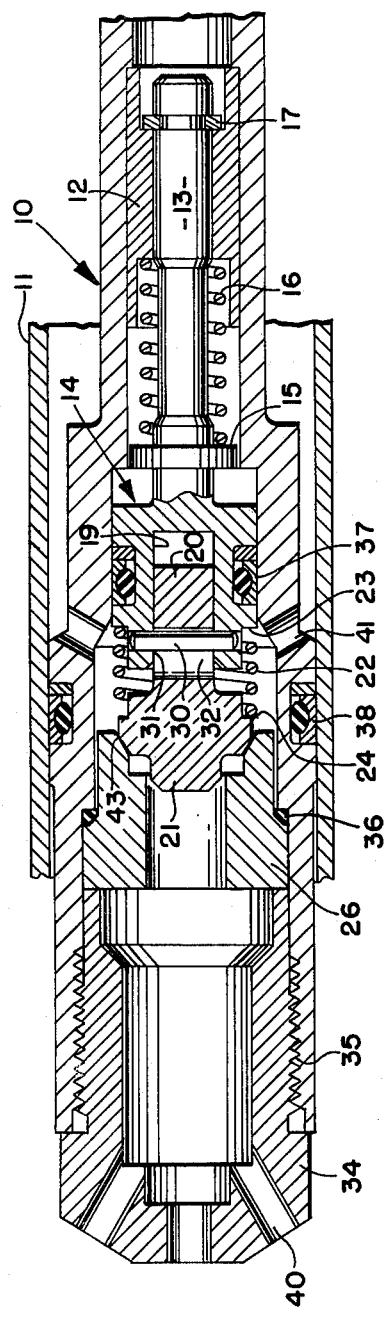
FIG. 1 is a fragmentary longitudinal section of a valve in accordance with the present invention in its "no flow" condition.

Referring now to such drawings, it will be seen that the relief valve of the present invention is mounted in a housing 10, which may be in the form of a piston and rod surrounded by cylinder 11. As indicated, the housing 10 is hollow and the interior thereof is provided with a bushing 12 in which is slip fitted the stem 13 of metering plunger actuator 14. The stem 13 is provided with a flange 15 and a compression spring 16 extends between such flange and the bushing 12. The compression spring 16 urges the actuator to the left as seen in FIG. 1 to the extent permitted by the engagement of retaining ring 17 with the end of the bushing 12.

At the opposite end, the actuator 14 is enlarged and provided with a center bore 19 in which is slip fitted the stem 20 of plunger or poppet 21. A somewhat smaller compression spring 22 extends between shoulder 23 on the actuator 14 and shoulder 24 on the plunger 21. Such spring urges the plunger 21 against seat 26.

The plunger 21 is connected to the actuator 14 by a lost-motion connection provided by pin 30 passing through holes in the actuator indicated at 31 and through an axially elongated slot 32 in the stem 20 of such metering plunger 21.

The assembly of parts is retained in the housing 10 by end cap 34 threadedly connected to the housing as indicated at 35. An O-ring seal is provided between the seat 26 and the housing as seen at 36 while a sliding seal 37 is provided between the actuator and the interior of the housing 10. A sliding seal 38 is also provided between the housing or piston and the surrounding cylinder 11. Ports 40 are provided in the end cap 34 for fluid flow and similarly, ports 41 are provided in the housing 10 on the opposite side of the seat also for fluid flow.

Referring now to FIG. 1, pressure applied through the ports 41 is retained by the seals 36 and 37, and, of course, by the seal 43 formed by the metering plunger or poppet 21 being forced by spring 22 against the seat 26. Since the cross-sectional area of the poppet 21 where it engages the seat as indicated at 43 is somewhat smaller than the cross-sectional area of the metering plunger actuator at the seal 37, the force balance is to the right as seen in the drawing and is counterbalanced by the preloaded spring 16. Such pressure through the ports 41 forces the metering plunger actuator 14 and the metering plunger 21 away from each other until the pin 30 is against the right-hand side of the slot 32. Then, when the hydraulic force balance exceeds the preload of the spring 16, the stem of the metering plunger actuator slides through the bushing, compressing spring 16 and pulls the metering plunger or poppet 21 off the seat 26 allowing flow between the poppet and seat in the direction of the arrows 45 in FIG. 2. Such condition represents the "forward" flow condition.

Figure 3:
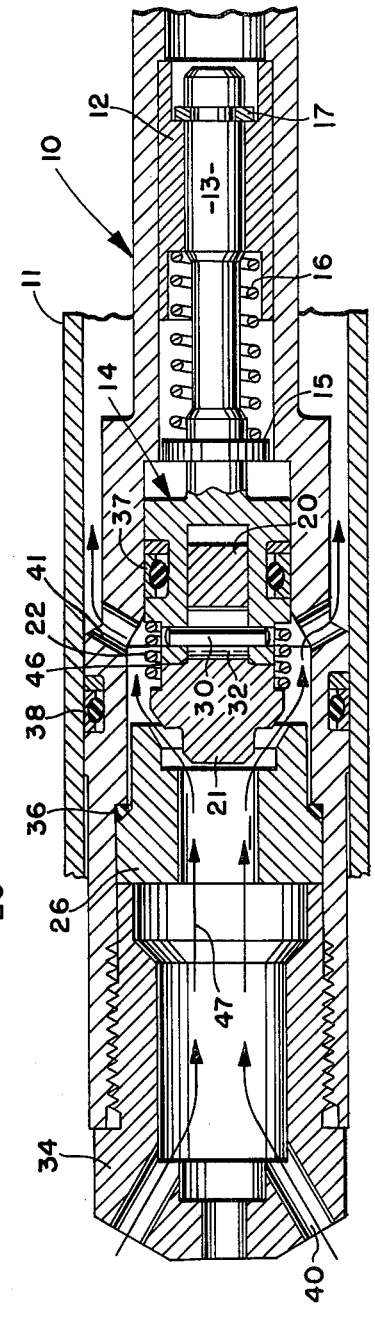
FIG. 3 is a similar view of the valve in its "reverse flow" condition.

Referring again to FIG. 1, when pressure is applied through the ports 40, such pressure is held by the seal 36 and the seal 43 formed by the metering plunger being forced by spring 22 against the seat 26. The pressure acts on the cross-sectional area of the diameter at 43 forcing the metering plunger 21 away from the seat 26 compressing the spring 22. This can be accomplished without moving the metering plunger actuator 14 or compressing its spring 16 since spring 22 has a smaller preload than spring 16. At larger pressures, the actuator 14 may also move to the right against the preload of its spring 16. At such larger pressures, the plunger 21 engages the actuator as seen at 46 in FIG. 3 and such force on the plunger is counterbalanced by both of the preloaded springs 22 and 16. In any event, as illustrated in FIG. 3, the spring 22 compresses first with the lost-motion slot moving to the right. In this manner, there is provided "reverse" flow as indicated by the arrows 47.

Accordingly, in accordance with the present invention, the poppet of the relief valve is "split" to provide two relatively movable spring loaded parts. In this manner, the forward and reverse flow conditions can be regulated by separate spring-force and pressure-area systems, but both flows are metered through the same seat 26.

Figure 2:
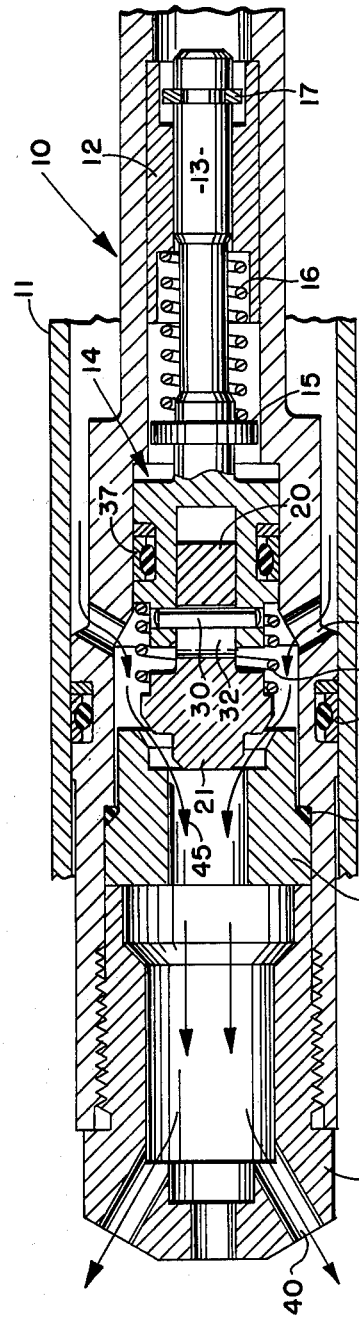
FIG. 2 is a similar illustration of the valve in its "forward flow" condition.

The present invention has a variety of applications in hydraulic systems. One such application in which it has been found to be useful is in a velocity limiting actuator for a jet engine. Its function in such application would be to provide a locking feature (FIG. 1) when the actuator is submitted to tension loads up to, for example, 500 lbs. at which time the lock would release (FIG. 2). It would also render the actuator passive when compressed (FIG. 3).

It can now be seen that there is provided a simplified relief valve having a two-part poppet providing both forward and reverse flow conditions, each having separate and unrelated modes of operation, yet both utilizing the same seat.

I, therefore, particularly point out and distinctly claim as my invention:

1. A poppet type relief valve comprising a seat and poppet, means responsive to pressure on one side of said poppet to open said poppet at a predetermined pressure to provide flow through said valve in one direction, and means responsive to pressure on the opposite side of said poppet to open said poppet at a predetermined pressure to provide flow through said valve in the opposite direction, including an actuator for said poppet operative to pull said poppet from said seat at a predetermined pressure, and a lost motion connection between said actuator and poppet, said lost motion connection comprising a pin and slot.

2. A poppet type relief valve comprising a seat and poppet, means responsive to pressure on one side of said poppet to open said poppet at a predetermined pressure to provide flow through said valve in one direction, and means responsive to pressure on the opposite side of said poppet to open said poppet at a predetermined pressure to provide flow through said valve in the opposite direction, including an actuator for said poppet operative to pull said poppet from said seat at a predetermined pressure, a lost motion connection between said actuator and poppet, and a poppet compression spring between said actuator and poppet urging the latter toward said seat.

3. A valve as set forth in claim 2 including an actuator compression spring urging said actuator toward said seat and against a positive stop.

4. A valve as set forth in claim 3 including a pressure surface on said actuator greater than the pressure surface of the poppet on the seat operative to move the actuator against said actuator spring and when the lost motion connection is taken up to pull the poppet from the seat.

5. A valve as set forth in claim 3 wherein said poppet compression spring is preloaded to a lesser extent than said actuator compression spring whereby said poppet may move away from said seat without moving said actuator.

6. A valve as set forth in claim 3 wherein said actuator includes a stem extending through a bushing, said actuator spring extending from said bushing to a shoulder on said actuator, and said positive stop comprises a ring on said stem adapted to engage the opposite end of said bushing.

7. A relief valve comprising a seat and a spring-loaded poppet, a spring-loaded actuator, and lost motion means interconnecting said actuator and poppet, whereby pressure on one side of said poppet will cause it to open at a predetermined pressure, and pressure on the other side will also cause it to open at another predetermined pressure, said poppet including a stem and said actuator including a bore receiving said stem, and said lost motion connection including a slot transversely of said stem and elongated axially of said stem, and a pin secured to said actuator and extending through said stem.

8. A relief valve comprising a seat and a spring-loaded poppet, a spring-loaded actuator, and lost motion means interconnecting said actuator and poppet, whereby pressure on one side of said poppet will cause it to open at a predetermined pressure, and pressure on the other side will also cause it to open at another predetermined pressure, said spring-loaded actuator including an actuator compression spring urging said actuator toward said seat, and a positive stop limiting movement of said actuator toward said seat, and said spring-loaded poppet including a spring between said poppet and actuator preloaded to a lesser extent than said actuator spring.

9. A relief valve as set forth in claim 8 including a pressure surface on said actuator operative to move said actuator and thus said poppet, when the lost motion connection is taken up, away from said seat when the force on said surface exceeds the preload of said actuator spring.

10. A relief valve comprising a seat and poppet, first spring means urging said poppet into engagement with said seat, an actuator, second spring means urging said actuator toward said seat, stop means limiting movement of said actuator toward said seat, and lost motion means interconnecting said actuator and poppet, said poppet being exposed to pressure on one side of said poppet causing said poppet to open at a predetermined pressure against the bias of said first spring means, and said actuator being exposed to pressure on the other side of said poppet causing movement of said actuator away from said seat against the bias of said second spring means thus also causing said poppet to open, when said lost motion means is taken up, at another predetermined pressure.

11. A relief valve as set forth in claim 10 wherein said poppet includes a stem and said actuator includes a bore receiving said stem, said lost motion means being between said stem and the wall of said bore.

12. A relief valve as set forth in claim 10 wherein said actuator includes a stem extending through a bushing, said second spring means extending from said bushing to a shoulder on said actuator, and said stop means comprising a ring on said stem adapted to engage the opposite end of said bushing.

13. A relief valve as set forth in claim 10 wherein said first spring means comprises a compression spring between said actuator and poppet urging the latter toward said seat.

14. A relief valve as set forth in claim 10 wherein said first spring means is preloaded to a lesser extent than said second spring means whereby said poppet may move away from said seat without moving said actuator.

* * * * *